(12) United States Patent
Schiebold et al.

(10) Patent No.: US 6,394,924 B1
(45) Date of Patent: May 28, 2002

(54) DRIVE ARRANGEMENT FOR A MOTOR VEHICLE

(75) Inventors: Stefan Schiebold, Schweinfurt; Manfred Röder, Bergrheinfeld, both of (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/676,712

(22) Filed: Sep. 29, 2000

Related U.S. Application Data (62) Division of application No. 09/390,820, filed on Sep. 7, 1999.

(30) Foreign Application Priority Data

Sep. 5, 1998 (DE) .......................... 198 40 575
Apr. 9, 1999 (DE) .......................... 199 15 926

(51) Int. Cl.[7] .................................. B60K 6/02
(52) U.S. Cl. ........................................ 475/5
(58) Field of Search ...................... 475/5, 149, 261; 180/65.2, 65.4; 74/7 E; 290/46

(56) References Cited

U.S. PATENT DOCUMENTS 5,237,230 A * 8/1993 Sugiyama et al. ............ 290/46
5,258,651 A * 11/1993 Sherman ................ 180/65.2 X
5,755,302 A 5/1998 Lutz et al.
5,895,333 A 4/1999 Morisawa et al.

FOREIGN PATENT DOCUMENTS

DE 43 23 601 A1 1/1995
WO WO 98/40647 9/1998

* cited by examiner

Primary Examiner—Charles A Marmor
Assistant Examiner—Ankur Parekh
(74) Attorney, Agent, or Firm—Cohen, Pontani, Lieberman & Pavane (57) ABSTRACT

A drive arrangement for a motor vehicle, having an internal combustion engine with a crankshaft which can be connected, via an interposed clutch, to a gearbox input shaft of a change-speed gearbox, and having an electric machine—for example an electric motor or a starter-generator—which is provided in the drive arrangement and which has a stator and a rotor. The electric machine, in order to step down its rotational speed, is operatively connected to the crankshaft and/or the gearbox input shaft via a step-down gear mechanism. The step-down gear mechanism is designed as an epicyclic gear mechanism, which has a sun gear, an internal gear and a number of planet gears. The epicyclic gear mechanism can be switched or clutch-operated via two clutches.

8 Claims, 5 Drawing Sheets

DRIVE ARRANGEMENT FOR A MOTOR VEHICLE

This is a division of application Ser. No. 09/390,820, filed Sep. 7, 1999.

FIELD OF THE INVENTION

The present invention relates to a drive arrangement for a motor vehicle, having an internal combustion engine with a crankshaft which can be connected, via an interposed clutch, to a gearbox input shaft of a change-speed gearbox. An electric machine is provided in the drive arrangement and has a stator and a rotor.

DISCUSSION OF THE PRIOR ART

Such a drive arrangement is disclosed, for example, by German reference DE 43 23 601 A1, in which a drive arrangement for a motor vehicle, in particular for a hybrid vehicle, is described. On account of the drive arrangement, which is constructed as above, the vehicle can be driven on the one hand by the internal combustion engine and on the other hand by the electric machine. The electric machine can also be activated, supporting the internal combustion engine, to drive the motor vehicle. Driving the vehicle by the electric machine alone is expedient, particularly in the range of low traveling speeds. However, in order then to make it possible to start up by means of the electric motor drive on its own, powerful electric machines are required which, on the one hand, have a large axial overall length and, on the other hand, are very costly.

In WO 98/40647, which, in relation to the first application on which priority is based, was published after the present application, a description is given of an electric machine integrated into a gearbox for motor vehicle internal combustion engines, and for the control thereof. Here too, the internal combustion engine can be connected, via a crankshaft and an interposed clutch, to a gearbox input shaft of a change-speed gearbox. Furthermore, an electric machine is provided which is switched via an intermediate gear mechanism in parallel with the gearbox input shaft. The intermediate gear mechanism is designed in the form of a step-up gear mechanism. As a result of the parallel arrangement of the intermediate gear mechanism, however, a relatively large amount of installation space is needed which, in particular from the point of view of passenger cars, is not available in the engine compartment thereof.

The electric machine described in WO 98/40647 can be designed as a so-called starter-generator. If the electric machine is switched as a starter motor, the internal combustion engine can be started thereby. When the internal combustion engine is in operation, it is possible to supply the on-board motor vehicle network via the electric machine switched as a generator. Starter-generators are normally slipped onto the crankshaft or the gearbox input shaft, so they must have the lowest possible space requirement.

SUMMARY OF THE INVENTION

On the basis of the above-mentioned prior art, the present invention is based on the object of developing a drive arrangement for a motor vehicle of the type mentioned at the beginning in such a way that the above-described disadvantages are avoided. In particular, it is intended to provide a drive arrangement which is particularly powerful and in which the production costs are reduced with respect to comparable drive arrangements. Furthermore, it is intended that the electric machine should also be designed to be particularly space-saving.

This object is achieved by a development of the drive arrangement mentioned at the beginning which, according to the invention, is defined by the fact that the electric machine, in order to step down its rotational speed, is operatively connected to the crankshaft and/or the gearbox input shaft via a step-down gear mechanism. The step-down gear mechanism is designed as an epicyclic gear mechanism which has a sun gear, an internal gear and a number of planet gears.

The drive arrangement designed in accordance with the invention makes it possible to circumvent the disadvantages described further above. If the electric machine is used, for example, as a starter-generator, the configuration according to the invention also makes it possible, even with relatively small electric machines, to produce such high torques when starting so that even the starting of large internal combustion engines is made possible. If the electric machine, for example, is used as an electric motor and is connected to the gearbox input shaft, it is made possible to start using the electric drive on its own with an acceleration response which is virtually identical in comparison to drive by the internal combustion engine. In this case, the overall axial length of the drive arrangement does not exceed a predetermined amount permitting transverse installation.

A basic idea of the present invention resides in the fact that the electric machine is operatively connected to the crankshaft and/or the gearbox input shaft via a separate step-down gear mechanism.

The use of an epicyclic gear mechanism as the step-down gear mechanism has proven to be particularly advantageous. Such an epicyclic gear mechanism can be arranged coaxially with the gearbox input shaft or with the crankshaft of the internal combustion engine. As a rule, epicyclic gear mechanisms have a sun gear, an internal gear and various planet gears, the individual gears being arranged and aligned coaxially with one another. In this way, an epicyclic gear mechanism constitutes a very effective gear mechanism with only a low space requirement.

The electric machine can advantageously be designed as a synchronous machine, especially a permanently excited synchronous machine, or as an asynchronous machine. The electric machine can be designed both as an external rotor type and as an internal rotor type. If an asynchronous motor is provided as the electric machine, its maximum rotational speed is around 10,000 rev/min. If the electric machine is designed as a synchronous motor, its maximum rotational speed lies in the range from 5000 to 10,000 rev/min. On the other hand, the maximum rotational speed of a modern internal combustion engine, especially of a diesel engine, lies in the range of 4000 rev/min. As a result of the measure of coupling the electric machine to the drivetrain via a step-down gear mechanism which steps down the rotational speed of the electric machine, the torque acting on the drivetrain from the electric machine is stepped up in such a way that the maximum permissible rotational speed of the electric machine is not exceeded. The torque which can be provided by the electric machine corresponds to a torque from a more powerful electric machine, which would take up many times the axial installation space. As a result of the drive arrangement according to the invention, the higher rotational speed of the electric machine can be stepped down by the step-down gear mechanism to the lower rotational speed of the internal combustion engine. At the same time, however, a high torque is transmitted.

The electric machine can be designed, for example, as an electric motor in a hybrid vehicle. The torque transmitted from the electric machine corresponds, inter alia as a result of the step-down gear mechanism, to a torque from a more powerful engine, in particular in the range of lower traveling speeds.

An electric machine which is particularly worth mentioning is, for example, also the starter-generator for vehicles. This is an electric machine whose rotor is mounted via the crankshaft mounting of the internal combustion engine. The starter-generator is used not only for starting and stopping the internal combustion engine but can also perform different functions during engine operation, such as supplying the on-board network with electrical energy (generator function), braking functions, booster functions, battery management, active vibration damping, synchronization of the internal combustion engine with the gearbox during change-speed operations, and the like.

The epicyclic gearbox can preferably be designed as a fixed-speed (fixed) epicyclic gear mechanism or as a clutch-operated or change-speed epicyclic gear mechanism.

In the following text, firstly some exemplary embodiments will be described in which a fixed-speed step-down gear mechanism is provided between engine and gearbox or, respectively, at the front end of the internal combustion engine, for the adaptation to an electric machine. In the further course of the description, exemplary embodiments will then also be described in which the step-down gear mechanism is designed as a change-speed/clutch-operated gear mechanism. However, the invention is not restricted to the exemplary embodiments described.

According to a preferred embodiment, the rotor of the electric machine can be operatively connected to the sun gear of the epicyclic gear mechanism, the sun gear meshing with planet gears mounted so as to be stationary. The planet gears in turn mesh with the internal gear that is operatively connected to the crankshaft or the gearbox input shaft. As a result, the internal gear can be driven by means of the electric machine.

In a further advantageous embodiment, provision is made for the rotor of the electric machine to be operatively connected to the sun gear of the epicyclic gear mechanism, the sun gear meshing with the planet gears. The planet gears in turn mesh with the internal gear which is fixed so that it cannot rotate (is stationary). The planet gears are rotatably mounted on a planet carrier (web pick-off), which is operatively connected to the crankshaft or the gearbox input shaft and is preferably permanently connected to the latter.

If an external rotor is used as the electric machine, it has proven to be advantageous to design the stator with an internal recess and in addition to provide the stator with a tooth system which points radially inward and forms the internal gear. With this configuration, a particularly compact arrangement of epicyclic gear mechanism and electric machine is possible.

An internal rotor type can advantageously be provided as the electric machine, the rotor of the electric machine being operatively connected so as to rotate with the sun gear of the epicyclic gear mechanism arranged parallel to the electric machine, preferably being permanently connected to the sun gear.

The planet gears can advantageously be rotatably mounted on protrusions which can be or are formed in one piece with a stator carrier. This permits a particularly compact arrangement of the step-down gear mechanism, and hence of the electric machine, to be provided.

In the following text, a design will be described in which the step-down gear mechanism can be switched or clutch-operated.

According to this preferred embodiment, the rotor of the electric machine can be operatively connected to the sun gear of the epicyclic gear mechanism, the sun gear meshing with planet gears which are rotatably mounted on a planet carrier. The planet carrier is operatively connected to the crankshaft or the gearbox input shaft. The planet gears also mesh with the internal gear, which is arranged so that it cannot rotate or can rotate, depending on the rotational speed of the sun gear.

In this embodiment, the epicyclic gear mechanism is operatively connected to the crankshaft or the gearbox input shaft via the planet carrier (web pick-off). The planet carrier is advantageously permanently connected to the shaft. Furthermore, the sun gear is connected—preferably permanently—to the rotor of the electric machine. At a low rotational speed of the sun gear, for example during the starting of the electric machine, the internal gear is coupled so that it rotates with a component of the electric machine—for example the stator. Beginning at a specific rotational speed, the coupling is broken, so that the internal gear can then corotate with the planet carrier. A coupling is then produced between the internal gear, the planet gears arranged on the planet carrier, and the sun gear.

The change-speed/clutch-operated step-down gear mechanism can preferably have at least two step-down ratios.

The epicyclic gear mechanism can advantageously have one or more, preferably two, clutches, via which it is or can be clutch-operated or its speed is or can be changed. The clutches may be designed radially or axially as friction clutches, multi-plate clutches or the like. For example, the clutch or the clutches can be designed as multi-plate clutches adjusted via toggle levers, as clutches which can be operated magnetically, mechanically, electrically, pneumatically or hydraulically, as centrifugal clutches or the like. The invention is not restricted to specific clutch types, so that other clutch types are also conceivable and possible.

The clutch or the clutches can advantageously be switched or operated as a function of the temperature and/or the rotational speed or the like. In the case of cold starting of the internal combustion engine, for example, a high starting torque is required, for which reason the step-down ratio has to be activated with the aid of the step-down gear mechanism (epicyclic gear mechanism). On the other hand, activation of the step-down gear mechanism during warm starting of the internal combustion engine is not necessary, because of the lower starting torque needed.

In a preferred embodiment, the clutch or the clutches is/are designed as centrifugal clutches, however.

For this purpose, the clutch or the clutches can advantageously have a spring pot, a compression spring and a piston.

If a plurality of clutches are used in the epicyclic gear mechanism, these can be connected to one another via a coupling element. Such a coupling element may be, for example—but not exclusively—, a leakage or the like. The coupling element achieves the situation in which, when one clutch is operated, the other clutch is also operated automatically.

In a particularly preferred embodiment, a change-speed/clutch-operated epicyclic gear mechanism is proposed for stepping down the electric machine, and is permanently connected to the crankshaft at the planet carrier (web pick-off), and to the sun gear at the rotor of the electric machine. During starting, the internal gear is coupled via a suitable clutch to the housing of the internal combustion engine or the housing of the change-speed gearbox, in such a way that it is initially arranged so that it cannot rotate. Beginning at a specific rotational speed (for example 500 rev/min), this first coupling is broken and, as far as possible at the same time, a second coupling between the internal gear and the sun gear and the planet carrier is produced. During starting, up to about 500 rev/min, a step-down ratio of about 3 to 5 is thus provided, and beginning at 500 rev/min, the rotor is coupled rigidly to the crankshaft. The execution of the couplings/change-speed elements can be controlled by centrifugal force (centrifugal clutch) or as a result of the actuation of electromagnets or other elements.

The electric machine can advantageously be arranged between the internal combustion engine and the change-speed gearbox or at the front end of the internal combustion engine.

As a rule, the electric machine will be provided between the internal combustion engine and the change-speed gearbox. In this case, it may be operatively connected either to the crankshaft of the internal combustion engine or to the gearbox input shaft of the change-speed gearbox. However, applications are also conceivable in which the electric machine is arranged at the front end of the internal combustion engine. In this case, the electric machine is operatively connected only to the crankshaft of the internal combustion engine. In the last-mentioned case, it is possible for the electric machine to be connected, for example via the rotor, to the pulley of the internal combustion engine. Other ancillary units can then also be driven by this pulley on the rotor.

At least one torsional vibration damper can advantageously be provided in the epicyclic gear mechanism. If such a torsional vibration damper is integrated in the epicyclic gear mechanism—for example in the planet carrier—vibration damping in the individual structural elements can be achieved in this way. If the electric machine is arranged between the internal combustion engine and the change-speed gearbox, it is possible, for example, for vibration damping in the drivetrain or in the clutch to be implemented via the vibration damper, for example with regard to a two-mass flywheel. If the electric machine is arranged at the front end of the internal combustion engine, it is possible, for example, for vibration damping or torsional damping of the belt drive to be achieved via the vibration damper.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PREFERRED EMBODIMENTS

Figure 1:
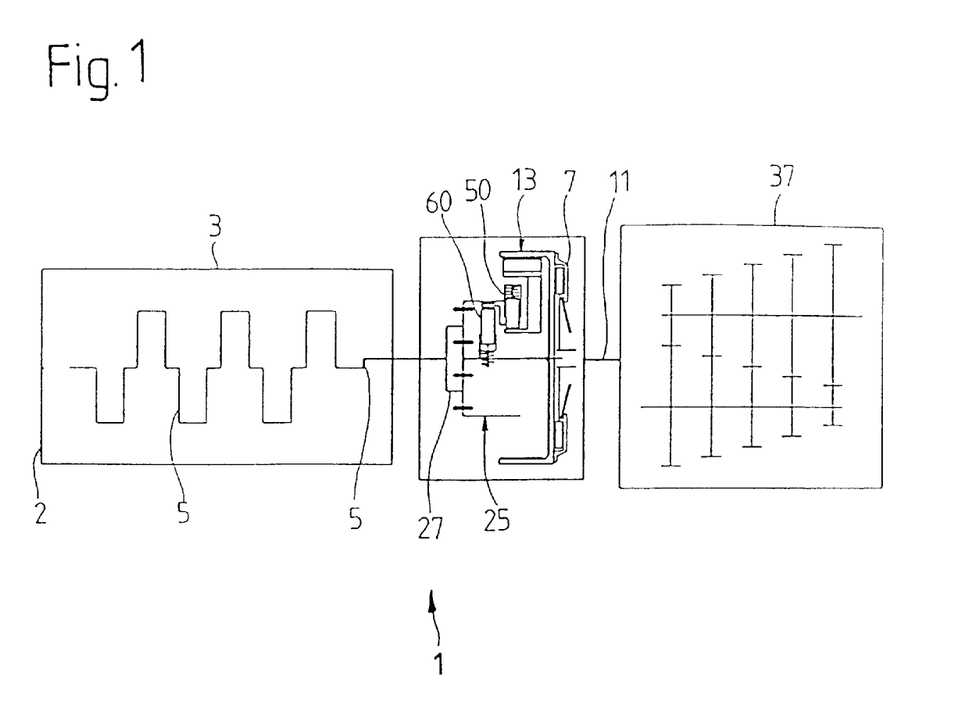
FIG. 1 shows a schematic overview of a drive arrangement according to the invention.

FIG. 1 illustrates a drive arrangement 1 for a motor vehicle, which has an internal combustion engine 3 with a crankshaft 5. The crankshaft 5 is connected, via an interposed clutch 7, to a gearbox input shaft 11 of a change-speed gearbox 37. In addition, an electric machine 13, which can be designed for example as an electric motor or starter-generator, is arranged between the internal combustion engine 3 and the change-speed gearbox 37. The electric machine 13 is also connected to a step-down gear mechanism 25, which is designed as an epicyclic gear mechanism 27. Depending on the requirement and application, the electric machine 13 could also be arranged at the front end 2 of the internal combustion engine.

Figure 2:
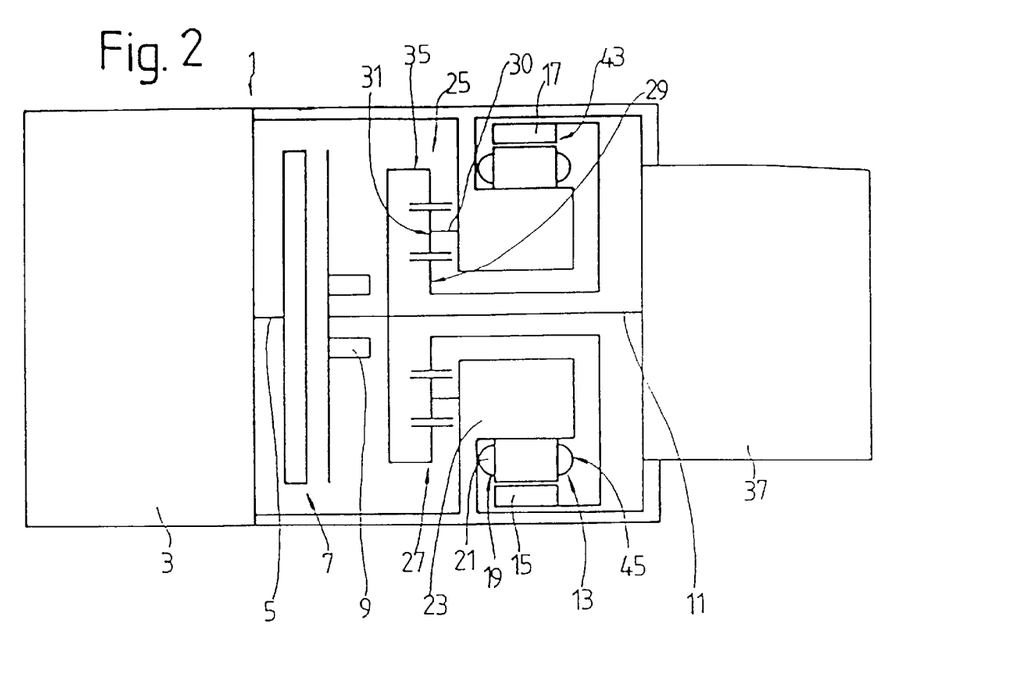
FIG. 2 shows a drive arrangement having an external rotor as electric motor and an epicyclic gear mechanism.

FIG. 2 illustrates a first embodiment of the drive arrangement 1 for driving a motor vehicle. This drive arrangement has an internal combustion engine 3 which is provided with a crankshaft 5 which can be connected, via a clutch 7 which is operated by means of a clutch operator 9, to a gearbox input shaft 11 of a down-line change-speed gearbox 37. Connected to the gearbox input shaft 11 is an internal gear 35 of the epicyclic gear mechanism 27 which is provided between the clutch 7 and the electric machine 13 and which is designed here as an external rotor type 43. The epicyclic gear mechanism 27 comprises planet gears 31, which are mounted so as to be stationary and which mesh on one side with the internal gear 35 and on the other side with a sun gear 29 which is connected so that it rotates with the rotor 15 of the electric machine 13. The electric machine 13 provided is preferably a synchronous machine 45, whose rotor 15 is equipped with permanent magnets 17. This rotor 15, designed as an external rotor 43, coaxially surrounds a radially inner stator 19, which is provided with coils 21 to which current can be applied and are preferably electrically conductively connected to an electric voltage source (not illustrated) via an interposed electronic unit. These coils 21 are connected to one another in a known way, so that a detailed description is omitted here. The electric machine 13 is connected to the gearbox input shaft 11 via the epicyclic gear mechanism 27 as a step-down gear mechanism 25, the epicyclic gear mechanism 27 being arranged on that side of the electric machine 13 remote from the change-speed gearbox 37.

In the following text, the operation of this drive arrangement 1 will be described in brief. For driving the vehicle by the internal combustion engine, the internal combustion engine 3 is started, the torque provided by the internal combustion engine 3 being transmitted to the gearbox input shaft 11 via the friction clutch 7. For a shifting operation of the change-speed gearbox 37, the clutch 7 is disengaged, so that the internal combustion engine 3, in particular its crankshaft 5, is uncoupled from the gearbox input shaft 11 and thus from the change-speed gearbox 37. As a result of the rotation of the gearbox input shaft 11, the internal gear 35 is also driven in rotation, as a result of which, via the epicyclic gear mechanism 27, the rotor 15 of the electric machine 13 also rotates in accordance with the step-down ratio of the epicyclic gear mechanism 27. This means that the rotational speed of the rotor 15 is a multiple of the rotational speed of the gearbox input shaft 11.

If only electric-motor operation is envisaged, the clutch 7 is disengaged and the rotor 15 of the electric machine 13 is set rotating by appropriate activation of the stator 19, as a result of which the gearbox input shaft 11 has a torque applied to it which is stepped up by means of the epicyclic gear mechanism 27. Driving the vehicle by means of the electric machine 13 is advantageous, in particular in the region of low traveling speeds, in which the internal combustion engine 3 has a poor efficiency. It is also possible to dispense with a reverse gear in the change-speed gearbox 37, if during reversing the vehicle is in principle driven by means of the electric machine 13.

Mixed operation is also possible, that is to say driving the vehicle by the internal combustion engine 3 and the electric machine 13, an additional torque assisting the torque provided by the internal combustion engine 3 being provided by the electric machine 13.

The functioning of the embodiments illustrated in FIGS. 3 to 7 does not differ significantly from the functioning described using FIG. 1, so that in the following text only the basic construction of the respective drive arrangement 1 will be described.

Figure 3:
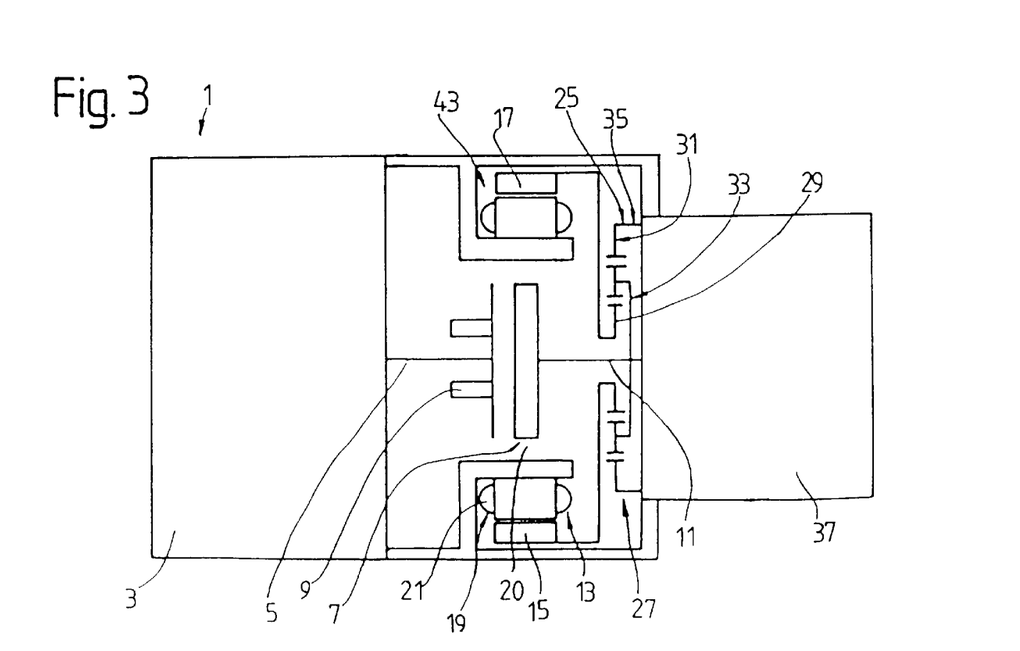
FIG. 3 shows a drive arrangement having an external rotor as electric machine, whose stator is arranged coaxially with a clutch.

FIG. 3 illustrates a drive arrangement 1 having an external rotor 43 as the electric machine 13, the clutch 7 being arranged within a recess 20 provided radially within the stator 19. This arrangement provides a particularly compactly designed drive arrangement 1. Once more, the rotor 15 of the electric machine 13 is permanently connected to the sun gear 29 of an epicyclic gear mechanism 27 which is connected downstream, arranged between the electric machine 13 and change-speed gearbox 37. Planet gears 31, which are rotably mounted on a planet carrier 33, mesh with the sun gear 29. This planet carrier 33 is operatively connected to the gearbox input shaft 11. In the embodiment illustrated, the planet carrier 33 is connected so as to rotate with the gearbox input shaft 11. However, provision may also be made to provide the planet carrier 33 with a torsional vibration damper. Provision may also be made to provide the rotor 15 with a torsional vibration damper or a spring element for damping torque fluctuations.

The planet gears 31 rotatably mounted on the planet carrier 33 mesh on one side with the sun gear 29 and on the other side with an internal gear 35, which is mounted so as to be stationary.

Figure 4:
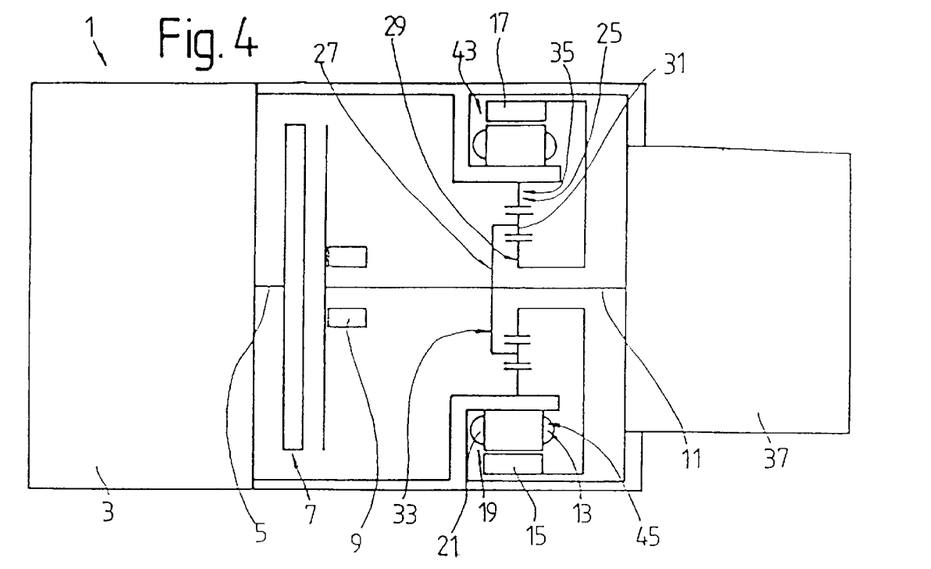
FIG. 4 shows a drive arrangement having an external rotor and an epicyclic gear mechanism arranged radially within the stator.

The drive arrangement according to FIG. 4 has an internal combustion engine 3, which is in turn operatively connected, via the clutch 7, to the gearbox input shaft 11. The electric machine 13 provided is again an external rotor type 43, whose rotor 15 is connected so that it rotates with a sun gear 29 of an epicyclic gear mechanism 27 arranged radially within the stator 19. Planet gears 31, which are rotatably mounted on a planet carrier 33, mesh with this sun gear 29. The planet carrier 33 is connected so as to rotate with the gearbox input shaft 11. The planet gears 31 are supported on an internal gear 35 that is permanently connected to the stator 19. This internal gear 35 is preferably formed in one piece with the stator carrier 23. The remaining construction does not differ from the construction described using the preceding figures.

Figure 5:
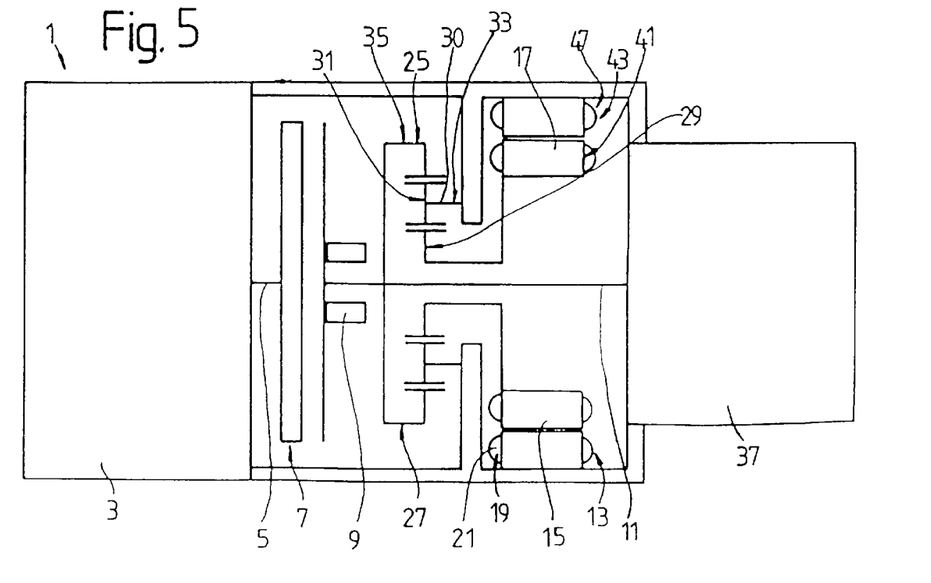
FIG. 5 shows a drive arrangement having an internal rotor.
Figure 6:
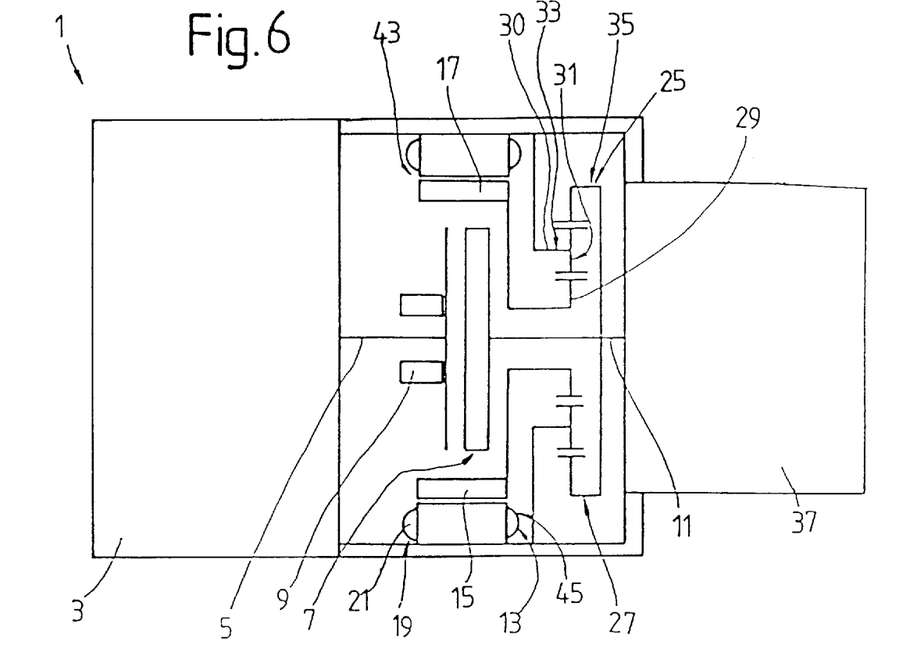
FIG. 6 shows a drive arrangement having an epicyclic gear mechanism arranged axially between the electric motor and gearbox.
Figure 7:
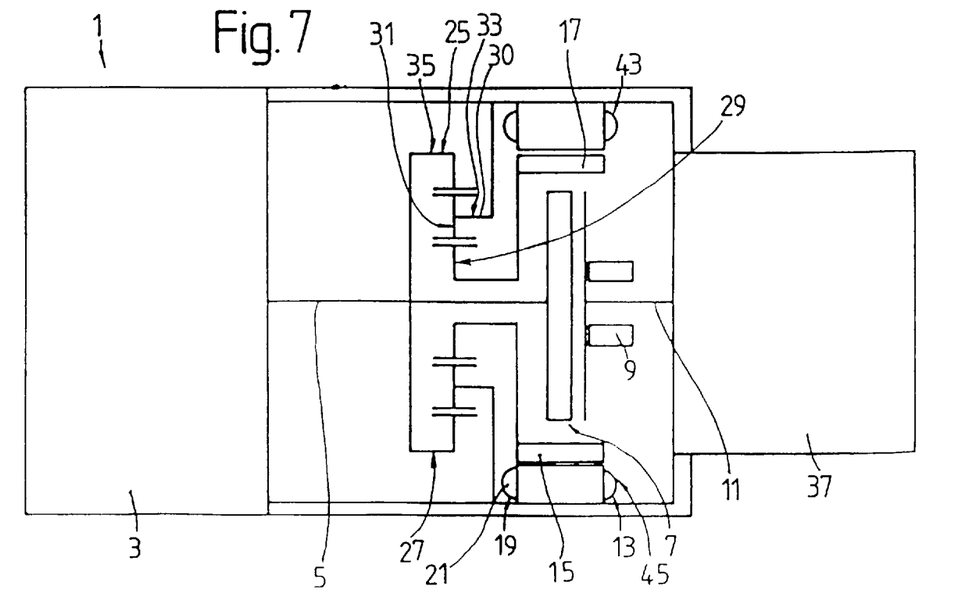
FIG. 7 shows a drive arrangement having an internal rotor, whose rotor is arranged coaxially with a clutch.

FIGS. 5 to 7 show designs of drive arrangements 1 which are provided with an internal rotor 41 as the electric machine 13, the electric machine 13 provided in these exemplary embodiments being an asynchronous machine 47, whose rotor 15 is likewise provided with electrically conductive windings. This electric machine 13 has the largest possible radius in accordance with the installation space conditions available, since the power which can be provided by the electric machine 13 is correlated with the radius. The rotor 15 of the electric machine 13 is operatively connected to the gearbox input shaft 11 via an epicyclic gear mechanism 27, which is arranged on that side of the change-speed gearbox 37 which is remote from the electric machine 13. This provided epicyclic gear mechanism 27 has an internal gear 35 which is connected so as to rotate with the gearbox input shaft 11, the planet gears 31 being rotatably mounted by protrusions 30 on a planet carrier 33 which is mounted so as to be stationary.

The exemplary embodiment shown in FIG. 6 differs from the exemplary embodiment illustrated in FIG. 5 only in the arrangement of the epicyclic gear mechanism 27, which in this design is arranged on that side of the electric machine 13 which faces the change-speed gearbox 37. The exemplary embodiment illustrated in FIG. 7 has an electric machine 13, it being possible for the clutch 7, radially within the rotor 15, to be brought into operative connection with the gearbox input shaft 11 by means of the crankshaft 5. The epicyclic gear mechanism 27 is arranged on that side of the electric machine 13 which is remote from the change-speed gearbox 37; in the exemplary embodiment illustrated, the internal gear 35 is connected so as to rotate with the crankshaft 5. The remaining construction corresponds to the exemplary embodiments that have already gone before.

Figure 8:
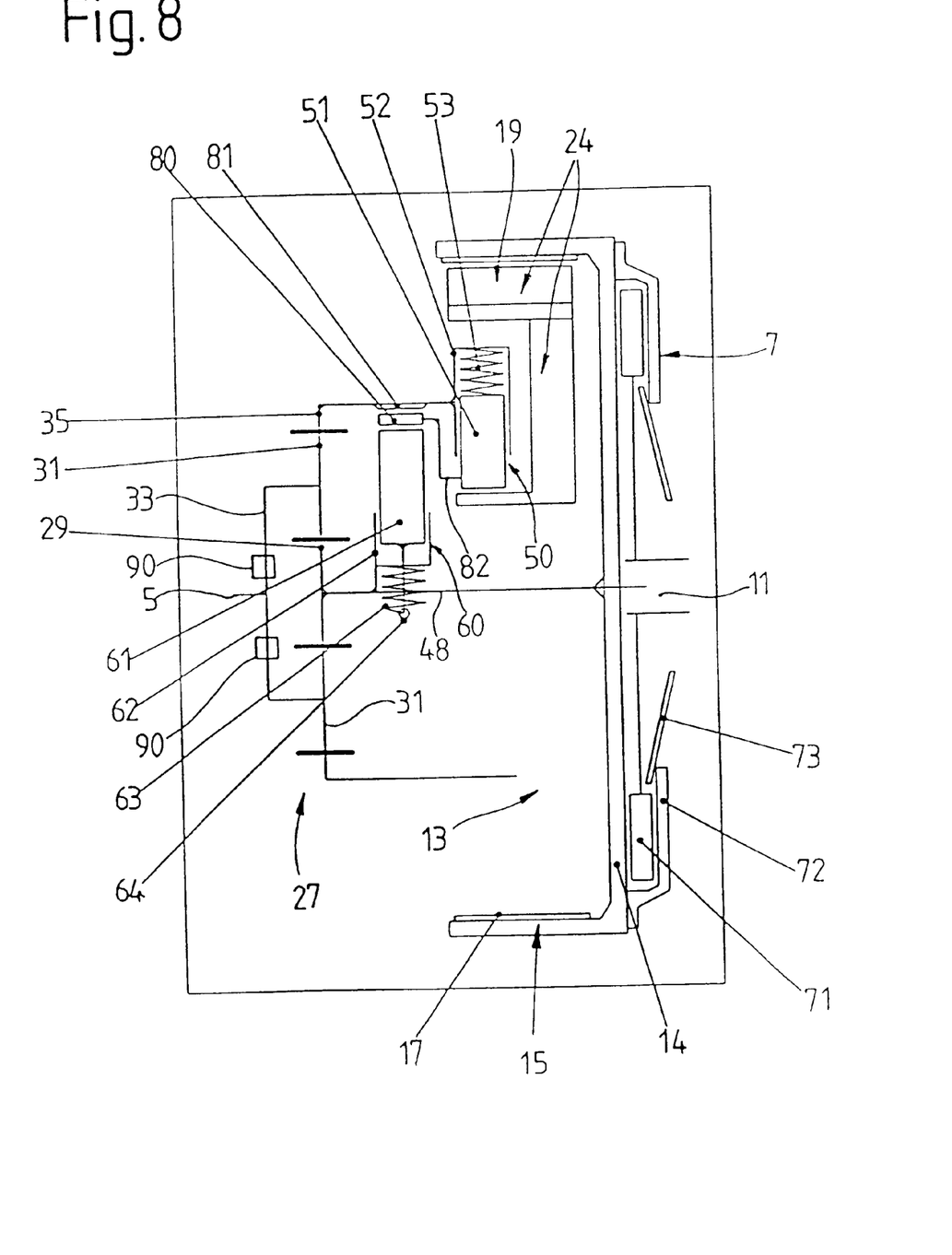
FIG. 8 shows a drive arrangement in which the epicyclic gear mechanism is of a change-speed/clutch-operated design.

FIG. 8 illustrates a drive arrangement 1 in which the epicyclic gear mechanism 27 is designed in the form of a change-speed/clutch-operated epicyclic gear mechanism 27. The conventional drivetrain, comprising the internal combustion engine 3, the clutch 7, which may be designed as a single-plate dry clutch, and the change-speed gearbox 37, is additionally provided with an electric machine 13 designed as a starter-generator. The electric machine 13 is a permanently excited synchronous machine of external rotor design. In the case of this type of construction, there is sufficient installation space available in the interior of the rotor 15 to integrate the self-changing epicyclic gear mechanism 27, which activates a step-down ratio during the starting operation.

The rotor 15 is directly coupled to the sun gear 29 of the epicyclic gear mechanism 27 via a rotor housing 14. Arranged on the rear of the rotor housing 14 is the clutch 7, which has, in a known way, a clutch disk 71 and a clutch pressure plate 72 with a diaphragm spring 73. The planet carrier 33 with its planet gears 31 is directly connected to the crankshaft 5 of the internal combustion engine 3.

The internal gear 35 of the epicyclic gear mechanism 27 has a spring pot 52 that is rigidly connected to the internal gear 35 and belongs to a clutch 50 designed as a centrifugal clutch. Provided within the spring pot 52 is a compression spring 53, which presses a piston 51 against the stationary stator housing 24, so that the internal gear 35 is pressed against the stator housing 24 by spring force as long as said internal gear 35 is not rotating. The result is therefore a step-down of revolutions between sun-gear shaft 48 and crankshaft 5 of $$i = 1 + z\_\text{internal gear}/z\_\text{sun gear},$$

which is advantageous for the starting of the internal combustion engine 3 with the aid of the starter-generator 13. "z" in the present case is the number of teeth on the gears.

Also permanently connected to the sun-gear shaft 48 is a spring pot 62 of a clutch 60, in which an internal piston 61 is kept lifted off an intermediate piece 80 by a compression spring 63 via a pull rod 64. The intermediate piece 80 is connected to the clutch 50, specifically to the piston 51, via a coupling element 82 designed as a linkage.

As long as the sun-gear shaft 48 rotates at a speed below a specific minimum rotational speed (for example<500 rev/min), the piston 61 will not permit any transmission of force. Once the sun-gear shaft 48 exceeds this above-mentioned minimum rotational speed, the piston 61 begins to exert a force or a torque on the intermediate piece 80. As a result, the piston 51, which is connected to the intermediate piece 80 by the coupling element 82, is lifted from its position, as a result of which the rigid coupling between the internal gear 35 and the stator housing 24 is canceled. The result is that the internal gear 35 now corotates. The piston 61 can be lifted at most until the intermediate piece 80 strikes a lining piece 81 which is arranged on the internal gear 35.

As a result of the increase in the rotational speed, and hence also the increase in the centrifugal force, a rigid coupling then results between the sun-gear shaft 48 and the internal gear 35, by which means the coupling needed for generator operation and having the step-up ratio of i_1 is established.

In order to dampen vibrations and torsions, it is also possible for two torsional vibration dampers 90 to be provided, these being integrated in the epicyclic gear mechanism 27 and advantageously provided in the planet carrier 33.

The invention is not limited by the embodiments described above which are presented as examples only but can be modified in various ways within the scope of protection defined by the appended patent claims.

We claim:

1. A drive arrangement for a motor vehicle, comprising:
   a change-speed gearbox having a gearbox input shaft;
   an internal combustion engine with a crankshaft;
   a clutch arranged to connect the crankshaft to the gearbox input shaft of the change-speed gearbox;
   an electric machine having a stator and a rotor;
   a step-down gear mechanism arranged operatively to connect the electric machine to at least one of the crankshaft and the gearbox input shaft in order to step down rotational speed of the electric machine, the step-down gear mechanism being designed as an epicyclic gear mechanism which has a sun gear, an internal gear and a number of planet gears; and
   a stator carrier having protrusions, the planet gears being rotatably mounted on the protrusions.

2. A drive arrangement as defined in claim 1, wherein the electric machine is a synchronous machine.

3. A drive arrangement as defined in claim 2, wherein the electric machine is a permanently excited synchronous machine.

4. A device arrangement as defined in claim 1, wherein the electric machine is an asynchronous machine.

5. A drive arrangement as defined in claim 1, wherein the epicyclical gear mechanism is one of a fixed-speed epicyclical gear mechanism, a clutch-operated epicyclical gear mechanism and a change-speed epicyclical gear mechanism.

6. A drive arrangement as defined in claim 5, wherein the rotor of the electric machine is operatively connected to the sun gear of the epicyclical gear mechanism, the sun gear meshing with the planet gears which are mounted so as to be stationary, the planet gears in turn mesh with the internal gear that is operatively connected to one of the crankshaft and the gearbox input shaft.

7. A drive arrangement as defined in claim 1, wherein the electric machine is an external rotor type, the stator being provided with an internal recess and a tooth system which points radially inward and forms the internal gear.

8. A drive arrangement as defined in claim 1, wherein the electric machine is arranged between the internal combustion engine and the change-speed gearbox.

* * * * *